(12) United States Patent
Wu

(10) Patent No.: US 10,824,219 B2
(45) Date of Patent: Nov. 3, 2020

(54) HARD DISK PEAK-STAGGERING STARTING SYSTEM

(71) Applicant: ZHENGZHOU YUNHAI INFORMATION TECHNOLOGY CO., LTD., Henan (CN)

(72) Inventor: Fukuan Wu, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 99 days.

(21) Appl. No.: 16/096,653

(22) PCT Filed: Jul. 21, 2017

(86) PCT No.: PCT/CN2017/093869
§ 371 (c)(1),
(2) Date: Oct. 25, 2018

(87) PCT Pub. No.: WO2018/103343
PCT Pub. Date: Jun. 14, 2018

(65) Prior Publication Data
US 2019/0155365 A1 May 23, 2019

(30) Foreign Application Priority Data
Dec. 9, 2016 (CN) .......................... 2016 1 1129293

(51) Int. Cl.
*G06F 1/3234* (2019.01)
*G11B 19/20* (2006.01)
*G11B 19/04* (2006.01)

(52) U.S. Cl.
CPC .......... *G06F 1/3268* (2013.01); *G11B 19/047* (2013.01); *G11B 19/209* (2013.01)

(58) Field of Classification Search
CPC .... G06F 1/3268; G11B 19/047; G11B 19/209
See application file for complete search history.

(56) References Cited

U.S. PATENT DOCUMENTS 6,668,305 B1 * 12/2003 Henriquez ............ G06F 13/385
711/112
7,305,572 B1 * 12/2007 Burroughs ................ G06F 1/26
360/272
(Continued)

FOREIGN PATENT DOCUMENTS

CN 102023939 A 4/2011
CN 102778942 A 11/2012
(Continued)

OTHER PUBLICATIONS

International Search Report for PCT/CN2017/093869 dated Oct. 25, 2017, ISA/CN.
(Continued)

*Primary Examiner* — Nimesh G Patel
(74) *Attorney, Agent, or Firm* — Yue (Robert) Xu; Apex Attorneys at Law, LLP

(57) ABSTRACT

Provided is a hard disk peak shift starting system, including: a power supply unit, a mainboard and a hard disk backplane. The power supply unit provides power to hard disks via a first power connector, a second power connector, E-Fuse chips and hard disk connectors. A Complex Programmable Logic Device (CPLD) unit sets a power-up starting sequence of the hard disks and a power-up starting time interval between the hard disks, and the CPLD unit is connected to a logical control end of each of the E-Fuse chips to control, based on the set power-up starting sequence and the set power-up starting time interval, on-off of a power supply end of each of the E-Fuse chips, to realize control of peak shift powering up and starting of the hard disks.

8 Claims, 1 Drawing Sheet

(56) References Cited

U.S. PATENT DOCUMENTS

| | | | |
|---|---|---|---|
| 2003/0011920 A1 | 1/2003 | Tsuchinaga | |
| 2006/0294269 A1* | 12/2006 | Duerk | G06F 1/3203 |
| | | | 710/62 |
| 2013/0173899 A1 | 7/2013 | Geukes | |
| 2014/0376125 A1* | 12/2014 | Zhou | G11B 19/209 |
| | | | 360/73.03 |
| 2015/0039915 A1 | 2/2015 | Deng | |
| 2017/0005571 A1* | 1/2017 | Wang | G06F 13/385 |
| 2017/0031849 A1* | 2/2017 | Yang | G06F 9/44505 |
| 2018/0322011 A1* | 11/2018 | Batcheller | H02H 7/20 |

FOREIGN PATENT DOCUMENTS

| | | |
|---|---|---|
| CN | 203054821 U | 7/2013 |
| CN | 104345827 A | 2/2015 |
| CN | 204595760 U | 8/2015 |
| CN | 205540711 U | 8/2016 |
| CN | 106774801 A | 5/2017 |

OTHER PUBLICATIONS

The 1st Office Action regarding Chinese Patent Application No. CN201611129293.9, dated Feb. 1, 2019. English Translation Provided.

* cited by examiner

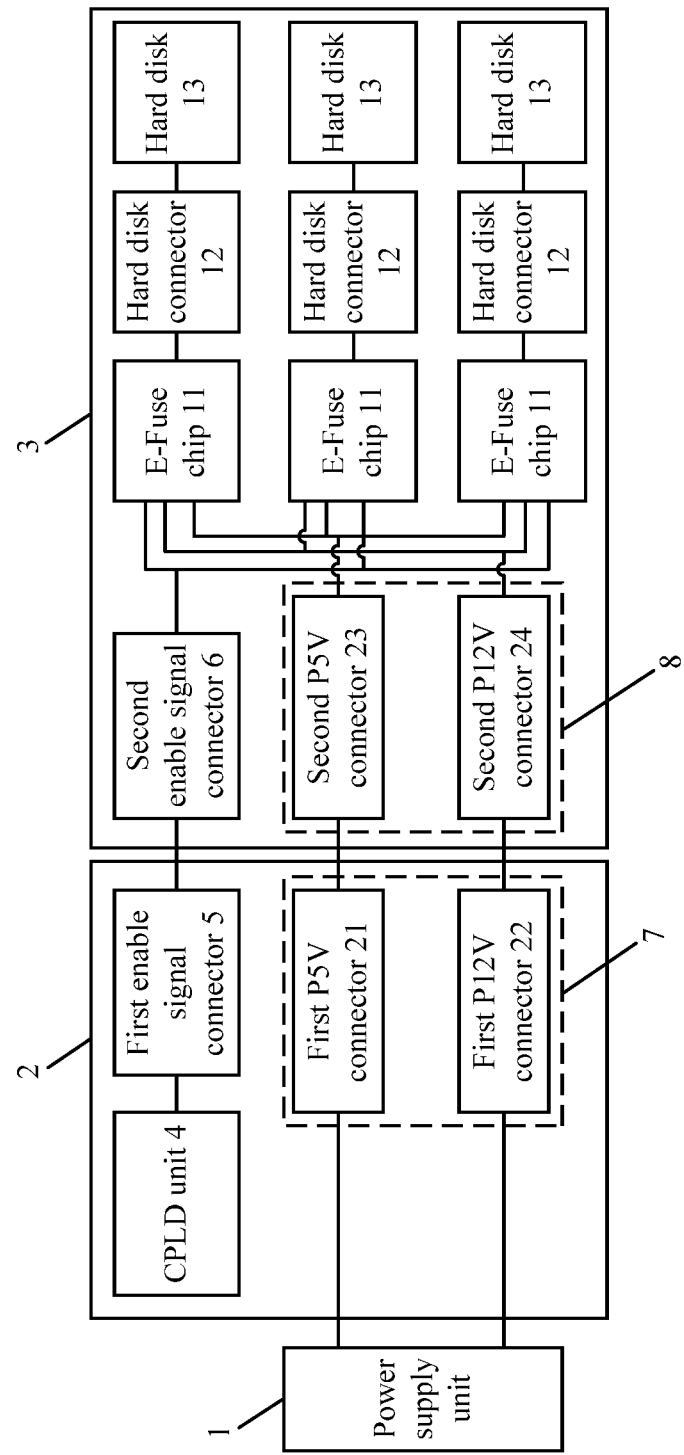

HARD DISK PEAK-STAGGERING STARTING SYSTEM

This application is a national phase application of PCT international patent application PCT/CN2017/093869, filed on Jul. 21, 2017 which claims priority to Chinese Patent Application No. 201611129293.9, titled "HARD DISK PEAK-STAGGERING STARTING SYSTEM", filed with the Chinese Patent Office on Dec. 9, 2016, both of which are incorporated herein by reference in their entireties.

FIELD

The present disclosure relates to the technical field of server, and in particular to a hard disk peak shift starting system.

BACKGROUND

With the continuous development of the science and technology, the amount of information is increased rapidly, and the requirement on performance of the server, in particular to requirement on a storage capacity of the server, is increased continuously.

At present, many servers have the large storage capacity, in order to meet operation of the server with the large storage capacity, the storage capacity of a single hard disk is increased and the number of the hard disks is increased. An increase in the capacity of the single hard disk results in an increase in power consumption of the hard disk. Similarly, an increase in the number of the hard disks results in an increase in the power consumption of the whole system, especially an increase in instantaneous power consumption when the system is started. The instantaneous power consumption when the system is started is much more than the power consumption of the hard disks during the normal operation, and the instantaneous power consumption when the system is started exceeds a rated value of a power supply, which has a great impact on a service life of the power supply.

Generally, the system power rated value is designed and deployed based on a comprehensive power consumption of the system obtained based on the power consumption of the system during the normal operation and the power consumption measured when the system is started. However, in particular to a case that the system has a large number of hard disks, the power consumption of the hard disk of the system when the system is started is much higher than the power consumption of the hard disk during the normal operation. If all the hard disks are powered up at the same time, the instantaneous power consumption may be very large, the instantaneous power consumption exceeds the rated value of the system, which results in that the system trips and is powered off, thus affecting the stability of the system operation.

Technical Problem

Solution to the Problem

Technical Solution

In order to overcome shortcomings of the conventional technology, the purpose of the present disclosure is to provide a hard disk peak shift starting system, which includes a power supply unit, a mainboard and a hard disk backplane.

The mainboard includes a CPLD unit, a first enable signal connector and a first power connector.

The hard disk backplane includes multiple hard disks, a second enable signal connector, a second power connector, E-Fuse chips and hard disk connectors. The number of the E-Fuse chips and the number of the hard disk connectors are same as the number of the hard disks. The E-Fuse chip is connected to the hard disk via the hard disk connector, and the E-Fuse chip includes a logical control end and a power supply end.

The power supply unit is connected to an input end of the first power connector. An output end of the first power connector is connected to an input end of the second power connector, and an output end of the second power connector is connected to the power supply end of each of the E-Fuse chips.

The power supply unit is configured to provide power to the hard disks via the first power connector, the second power connector, the E-Fuse chips and the hard disk connectors.

The CPLD unit is connected to an input end of the second enable signal connector via the first enable signal connector, and an output end of the second enable signal connector is connected to the logical control end of each of the E-Fuse chips.

The CPLD unit is configured to set a power-up starting sequence of the hard disks and a power-up starting time interval between the hard disks. The CPLD unit is connected to the logical control end of each of the E-Fuse chips to control, based on the set power-up starting sequence and the set power-up starting time interval, on-off of the power supply end of each of the E-Fuse chips, to realize control of peak shift powering up and starting of the hard disks.

Preferably, the CPLD unit includes a time interval setting module, an enable signal transmitting module and a power-up starting sequence setting module.

The power-up starting sequence setting module is configured to set the power-up starting sequence of the hard disks.

The time interval setting module is configured to set the power-up starting time interval between the hard disks.

The enable signal transmitting module is configured to, based on the set power-up starting sequence and the set power-up starting time interval, transmit enable control information to the E-Fuse chips to control on-off of the E-Fuse chips, to realize control of peak shift powering up and starting of the hard disks.

Preferably, the first power connector includes a first P5V connector and a first P12V connector.

An input end of the first P5V connector is connected to the power supply unit, an output end of the first P5V connector is connected to the second power connector.

An input end of the first P12V connector is connected to the power supply unit, an output end of the first P12V connector is connected to the second power connector.

Preferably, the second power connector includes a second P5V connector and a second P12V connector.

An input end of the second P5V connector is connected to the output end of the first P5V connector, an output end of the second P5V connector is connected to the power supply end of each of the E-Fuse chips.

An input end of the second P12V connector is connected to the output end of the first P12V connector, an output end of the second P12V connector is connected to the power supply end of each of the E-Fuse chips.

Preferably, the input end of the second P5V connector is connected to the output end of the first P5V connector via a P5V_HDD connecting line.

The input end of the second P12V connector is connected to the output end of the first P12V connector via a P12V_HDD connecting line.

Preferably, the power supply end of the E-Fuse chip includes a P5V power supply end and a P12V power supply end.

An input end of the P5V power supply end is connected to the output end of the second P5V connector, an output end of the P5V power supply end is connected to the hard disk connector.

An input end of the P12V power supply end is connected to the output end of the second P12V connector, an output end of the P12V power supply end is connected to the hard disk connector.

Preferably, the output end of the P5V power supply end is connected to the hard disk connector via a P5V_HDD connecting line.

The output end of the P12V power supply end is connected to the hard disk connector via a P12V_HDD connecting line.

Preferably, the power supply unit includes an alternating-direct current converter, a transformer circuit and a voltage stabilizing circuit.

An input end of the alternating-direct current converter is connected to mains electricity, an output end of the alternating-direct current converter is connected to an input end of the transformer circuit, an output end of the transformer circuit is connected to an input end of the voltage stabilizing circuit, and an output end of the voltage stabilizing circuit is connected to the first power connector.

Advantageous Effect of the Disclosure

Advantageous Effect

It may be seen from the above technical solutions, the present disclosure has following advantages.

The power supply unit is connected to the input end of the first power connector, the output end of the first power connector is connected to the input end of the second power connector, the output end of the second power connector is connected to the power supply end of each of the E-Fuse chips, such that a power supply circuit for the hard disks is formed. The CPLD unit sets the power-up starting sequence of the hard disks and the power-up starting time interval between the hard disks. The CPLD unit is connected to the logical control end of each of the E-Fuse chips to control, based on the set power-up starting sequence and the set power-up starting time interval, on-off of the power supply end of each of the E-Fuse chips, to realize control of peak shift powering up and starting of the hard disks and reduce the instantaneous power consumption when the system is started and ensure stable operation of the system.

BRIEF DESCRIPTION OF THE DRAWINGS

Description of the Drawings

In order to more clearly illustrate technical solutions according to the present disclosure, the drawings to be used in the description of the embodiments are briefly described below. Apparently, the drawings in the following description only describe some embodiments of the present disclosure, and other drawings may be obtained by those skilled in the art according to the drawings provided herein without any creative work.

FIG. 1 is a schematic diagram of a hard disk peak shift starting system.

EMBODIMENTS OF THE DISCLOSURE

Embodiments of the Present Disclosure

In order to make purposes, features and advantages of the present disclosure more obvious and understandable, the technical solutions according to the present disclosure are described clearly and completely in conjunction with the embodiments and the drawings in the embodiments. It is apparent that the described embodiments are only a few rather than all of the embodiments of the present disclosure. Any other embodiments obtained based on the embodiments of the present disclosure by those skilled in the art without any creative work fall within the scope of protection of the present disclosure.

A hard disk peak shift starting system is provided according to the embodiment, as shown in FIG. 1, the hard disk peak shift starting system includes a power supply unit 1, a mainboard 2 and a hard disk backplane 3.

The mainboard 2 includes a CPLD unit 4, a first enable signal connector 5 and a first power connector 7.

The hard disk backplane 3 includes multiple hard disks 13, a second enable signal connector 6, a second power connector 8, E-Fuse chips 11 and hard disk connectors 12. The number of the E-Fuse chips 11 and the number of the hard disk connectors 12 are same as the number of the hard disks 13. The E-Fuse chip includes a logical control end and a power supply end. The E-Fuse chip 11 is connected to the hard disk via the hard disk connector 12.

The power supply unit 1 is connected to an input end of the first power connector 7. An output end of the first power connector 7 is connected to an input end of the second power connector 8. An output end of the second power connector 8 is connected to the power supply end of each of the E-Fuse chips 11.

The power supply unit 1 is configured to provide power to the hard disks 13 via the first power connector 7, the second power connector 8, the E-Fuse chips 11 and the hard disk connectors 12.

The CPLD unit 4 is connected to an input end of the second enable signal connector 6 via the first enable signal connector 5. An output end of the second enable signal connector 6 is connected to the logical control end of each of the E-Fuse chips 11.

The CPLD unit 4 is configured to set a power-up starting sequence of the hard disks and a power-up starting time interval between the hard disks. The CPLD unit is connected to the logical control end of each of the E-Fuse chips 11 to control, based on the set power-up starting sequence and the set power-up starting time interval, on-off of the power supply end of each of the E-Fuse chips, to realize control of peak shift powering up and starting of the hard disks.

In the embodiment, the CPLD unit 4 includes a time interval setting module, an enable signal transmitting module and a power-up starting sequence setting module.

The power-up starting sequence setting module is configured to set the power-up starting sequence of the hard disks. The time interval setting module is configured to set the power-up starting time interval between the hard disks. The enable signal transmitting module is configured to, based on the set power-up starting sequence and the set power-up starting time interval, transmit enable control information to the logical control ends of the E-Fuse chips 11 to control on-off of the power supply ends of the E-Fuse chips, to realize control of peak shift powering up and starting of the hard disks.

VT505 of Maxim or ADM1278 of ADI is used as the E-Fuse chip 5. The E-Fuse chip controls on-off of a main loop with an electron transfer feature. The E-Fuse chip may be programmed with I/O circuit and a voltage on the chip is typically 3.3V. The E-Fuse chip has a Power Management Bus (PMBus). The PMBus is an open standard digital power management protocol. Communications between the chip and power converters or other devices may be facilitated by defining transport and physical interfaces as well as command languages.

In addition to a switch function, the E-Fuse chip also implements protection functions for a single hard disk, such as over-voltage protection, low-voltage protection, over-current protection, and improves the security of the entire system. The E-Fuse chip also implements isolation of the single hard disk, such that in the case that a single hard disk is failed, the failed hard disk may not have any impact on the entire system.

Complex Programmable Logic Device (CPLD) is a device developed from PAL and GAL devices. The CPLD has relatively large scale and complicated structure, and belongs to a scope of large-scale integrated circuits. The CPLD is a digital integrated circuit that a user constructs logic functions based on needs of the user. A basic design method of the CPLD includes; generating a corresponding target file with a schematic diagram, a hardware description language and other methods by using an integrated development software platform; and transferring code to a target chip through a download cable ("in-system" programming) to achieve a designed digital system.

The CPLD unit is forming by surrounding a central programmable interconnect matrix unit by programmable logic macrocells. A MC has a complex structure and a complex I/O unit interconnection structure. The user may generate a specific circuit structure based on needs to complete a certain function. Since a metal wire with a fixed length is used to interconnect logic blocks in the CPLD, the designed logic circuit has the predictability in time, which avoids the disadvantage of incomplete prediction of the time sequence in a segmented interconnect structure.

A power-up starting sequence of the hard disks and a power-up starting time interval between the hard disks are set by programming the CPLD unit. The CPLD unit is connected to the logical control end of each of the E-Fuse chips to control, based on the set power-up starting sequence and the set power-up starting time interval, on-off of the power supply end of each of the E-Fuse chips, to realize control of peak shift powering up and starting of the hard disks.

In this way, the CPLD unit may be programmed to realize the peak shift starting of the hard disks. Functions of softstar, OCP and OVP of each of the E-FUSE chips may be set based on actual measurement conditions, which may meet functions other than the peak shift starting of the hard disks and improve the reliability of the system.

In the embodiment, the first power connector 7 includes a first P5V connector 21 and a first P12V connector 22.

An input end of the first P5V connector 21 is connected to the power supply unit 1, an output end of the first P5V connector 21 is connected to the second power connector 8. An input end of the first P12V connector 22 is connected to the power supply unit 1, an output end of the first P12V connector 22 is connected to the second power connector 8.

The second power connector 8 includes a second P5V connector 23 and a second P12V connector 24.

An input end of the second P5V connector 23 is connected to the output end of the first P5V connector 21, an output end of the second P5V connector 23 is connected to the power supply end of each of the E-Fuse chips 11.

An input end of the second P12V connector 24 is connected to the output end of the first P12V connector 22, an output end of the second P12V connector 24 is connected to the power supply end of each of the E-Fuse chips 11.

The input end of the second P5V connector 23 is connected to the output end of the first P5V connector 21 via a P5V_HDD connecting line.

The input end of the second P12V connector 24 is connected to the output end of the first P12V connector 22 via a P12V_HDD connecting line.

The power supply end of the E-Fuse chip 11 includes a P5V power supply end and a P12V power supply end.

An input end of the P5V power supply end is connected to the output end of the second P5V connector 23, an output end of the P5V power supply end is connected to the hard disk connector 12. An input end of the P12V power supply end is connected to the output end of the second P12V connector 24, an output end of the P12V power supply end is connected to the hard disk connector 12.

The output end of the P5V power supply end is connected to the hard disk connector 12 via a P5V_HDD connecting line. The output end of the P12V power supply end is connected to the hard disk connector via a P12V_HDD connecting line.

The power supply unit includes an alternating-direct current converter, a transformer circuit and a voltage stabilizing circuit. An input end of the alternating-direct current converter is connected to mains electricity, an output end of the alternating-direct current converter is connected to an input end of the transformer circuit, an output end of the transformer circuit is connected to an input end of the voltage stabilizing circuit, and an output end of the voltage stabilizing circuit is connected to the first power connector.

It should be noted that the embodiments in the disclosure are described in a progressive manner, with the emphasis of each of the embodiments on the difference from other embodiments. For the same or similar parts between the embodiments, reference may be made one to another.

The provided embodiments are described below, such that those skilled in the art may realize or use the disclosure. The various modifications to these embodiments are apparent to those skilled in the art, and general principles defined in the disclosure may be implemented in other embodiments without departing from the spirit or scope of the present disclosure. Therefore, the disclosure is not limited to the embodiments shown in this disclosure, but shall conform to the widest scope consistent with the principles and novel features of this disclosure.

The invention claimed is:

1. A hard disk peak shift starting system, comprising:
   a mainboard comprising a Complex Programmable Logic Device (CPLD) unit, a first enable signal connector and a first power connector;
   a hard disk backplane comprising a plurality of hard disks, a second enable signal connector, a second power connector, E-Fuse chips and hard disk connectors, wherein the number of the E-Fuse chips and the number of the hard disk connectors are same as the number of the hard disks, the E-Fuse chip is connected to the hard disk via the hard disk connector, and the E-Fuse chip comprises a logical control end and a power supply end; and a power supply unit connected to an input end of the first power connector, wherein an output end of the first power connector is connected to an input end of the second power connector, and an output end of the second power connector is connected to the power supply end of each of the E-Fuse chips, wherein the power supply unit is configured to provide power to the hard disks via the first power connector, the second power connector, the E-Fuse chips and the hard disk connectors;

the CPLD unit is connected to an input end of the second enable signal connector via the first enable signal connector, and an output end of the second enable signal connector is connected to the logical control end of each of the E-Fuse chips; and the CPLD unit is configured to set a power-up starting sequence of the hard disks and a power-up starting time interval between the hard disks, and the CPLD unit is connected to the logical control end of each of the E-Fuse chips to control, based on the set power-up starting sequence and the set power-up starting time interval, on-off of the power supply end of each of the E-Fuse chips, to realize control of peak shift powering up and starting of the hard disks.

2. The hard disk peak shift starting system according to claim 1, wherein the CPLD unit comprises:

a power-up starting sequence setting module configured to set the power-up starting sequence of the hard disks;

a time interval setting module configured to set the power-up starting time interval between the hard disks; and an enable signal transmitting module configured to, based on the set power-up starting sequence and the set power-up starting time interval, transmit enable control information to the E-Fuse chips to control on-off of the E-Fuse chips, to realize control of peak shift powering up and starting of the hard disks.

3. The hard disk peak shift starting system according to claim 1, wherein the first power connector comprises a first P5V connector and a first P12V connector;

an input end of the first P5V connector is connected to the power supply unit, an output end of the first P5V connector is connected to the second power connector; and an input end of the first P12V connector is connected to the power supply unit, an output end of the first P12V connector is connected to the second power connector.

4. The hard disk peak shift starting system according to claim 3, wherein the second power connector comprises a second P5V connector and a second P12V connector;

an input end of the second P5V connector is connected to the output end of the first P5V connector, an output end of the second P5V connector is connected to the power supply end of each of the E-Fuse chips; and an input end of the second P12V connector is connected to the output end of the first P12V connector, an output end of the second P12V connector is connected to the power supply end of each of the E-Fuse chips.

5. The hard disk peak shift starting system according to claim 4, wherein the input end of the second P5V connector is connected to the output end of the first P5V connector via a P5V_HDD connecting line; and the input end of the second P12V connector is connected to the output end of the first P12V connector via a P12V_HDD connecting line.

6. The hard disk peak shift starting system according to claim 4, wherein the power supply end of the E-Fuse chip comprises a P5V power supply end and a P12V power supply end;

an input end of the P5V power supply end is connected to the output end of the second P5V connector, an output end of the P5V power supply end is connected to the hard disk connector; and an input end of the P12V power supply end is connected to the output end of the second P12V connector, an output end of the P12V power supply end is connected to the hard disk connector.

7. The hard disk peak shift starting system according to claim 6, wherein the output end of the P5V power supply end is connected to the hard disk connector via a P5V_HDD connecting line; and the output end of the P12V power supply end is connected to the hard disk connector via a P12V_HDD connecting line.

8. The hard disk peak shift starting system according to claim 1, wherein the power supply unit comprises an alternating-direct current converter, a transformer circuit and a voltage stabilizing circuit; and an input end of the alternating-direct current converter is connected to mains electricity, an output end of the alternating-direct current converter is connected to an input end of the transformer circuit, an output end of the transformer circuit is connected to an input end of the voltage stabilizing circuit, and an output end of the voltage stabilizing circuit is connected to the first power connector.

* * * * *